United States Patent [19]
Lai

[11] Patent Number: 5,910,784
[45] Date of Patent: Jun. 8, 1999

[54] CONTROL CIRCUIT OF A REMOTE CONTROLLER

[76] Inventor: Jung-Hua Lai, No. 4, Lane 86, Te-Ho Rd., Yungho City, Taipei County, Taiwan

[21] Appl. No.: 08/944,475

[22] Filed: Oct. 6, 1997

[51] Int. Cl.$^6$ .................................................. G08C 19/12
[52] U.S. Cl. ................... 341/176; 341/173; 340/825.69; 340/825.72; 348/734
[58] Field of Search ..................... 341/176, 173; 340/825.69, 825.72; 348/734; 455/603

[56]           References Cited

U.S. PATENT DOCUMENTS

| | | | |
|---|---|---|---|
| 4,703,359 | 10/1987 | Rumbolt ................................. | 348/734 |
| 4,959,810 | 9/1990 | Darbee ................................. | 340/825.69 |
| 5,128,667 | 7/1992 | Enomoto ............................. | 340/825.72 |
| 5,485,149 | 1/1996 | Takiguchi ............................ | 340/825.69 |
| 5,537,463 | 7/1996 | Escobosa ................................ | 379/102 |
| 5,614,906 | 3/1997 | Hayes ........................................ | 341/176 |

*Primary Examiner*—Michael Horabik
*Assistant Examiner*—Albert K. Wong
*Attorney, Agent, or Firm*—Rosenberg, Klein & Bilker

[57]           ABSTRACT

A control circuit of a remote controller includes a CPU, the CPU having a data memory adapted to store signal codes of different electric apparatuses. A procedure table memory adapted to record key switch functions of different electric apparatuses is included. A computing element is provided for sequencing through a plurality of the stored signal codes. A search interruption is included that is adapted to interrupt the sequential output of the signal codes when an output code is in conformity with a selected function of a particular electric apparatus. An emission output device is coupled to the CPU to transmit the signal codes to the electric apparatus.

3 Claims, 4 Drawing Sheets

| K1 | AUX/CABLE | K9 | TV/AV | K17 | 4 | K25 | 100/10/ENT | K33 | REC |
| --- | --- | --- | --- | --- | --- | --- | --- | --- | --- |
| K2 | VCR/LD | K10 | MTS | K18 | 5 | K26 | 0/11 | K34 | PAUSE |
| K3 | TV | K11 | MUTE | K19 | 6 | K27 | 12/20/INTERCHANGE | K35 | TRACK − |
| K4 | SHIFTE | K12 | POWER | K20 | VOL | K28 | CH | K36 | TRACK + |
| K5 | CH-SETTING | K13 | 1 | K21 | 7 | K29 | STOP | | |
| K6 | CATV | K14 | 2 | K22 | 8 | K30 | PALY | | |
| K7 | DISPLY | K15 | 3 | K23 | 9 | K31 | RWE | | |
| K8 | MENU | K16 | VOL | K24 | CH | K32 | FF | | |

FIG. 4

CONTROL CIRCUIT OF A REMOTE CONTROLLER

BACKGROUND OF THE INVENTION

The present invention relates to remote controllers for electric apparatus, and more specifically to a control circuit of a remote controller which can be conveniently set for controlling a variety of electric apparatus.

Conventionally, different remote controllers for different electric apparatus are not interchangeable. Therefore, a variety of remote controllers are used in every family for controlling different electric apparatus. In case a remote controller is damaged or lost, one shall have to purchase a similar remote controller having the same code. There are electric apparatus suppliers who provide a remote controller for controlling different models of their electric apparatus. When in use, the user can set into the remote controller the code of the model of the electric apparatus to be controlled. When a new model of electric apparatus is used, the setting of the remote controller shall be changed again. This structure of remote controller is not compact because much installation space must be provided at the control panel for mounting a variety of switching keys. There are also known remote controllers having a semi-automatical code searching function for searching the frequencies of different electric apparatus. When to control a particular electric apparatus, the remote controller is aimed at the electric apparatus to be controlled, and then the power switch of the remote controller is continuously clicked. When the power switch of the remote controller is clicked, a particular frequency is transmitted to the electric apparatus to be controlled. If the power switch of the electric apparatus to be controlled is switched on or off when continuously clicking the power switch of the remote controller, the correct frequency is searched, and the code is locked. This searching method is complicated and takes much time. Further, when the correct frequency is searched, it must be locked within a predetermined locking time. If the searched frequency is not locked within the predetermined locking time, the searching fails and must be started again.

SUMMARY OF THE INVENTION

The present invention has been accomplished to provide a control circuit for a remote controller which eliminates the aforesaid drawbacks. The control circuit of the present invention achieves the following advantages:

(1) Auto-Searching:

When the remote controller is aimed at the electric apparatus to be controlled (such as TV, video cassette recorder, video disk player, audio equipment, air conditioner, etc.) and the setting key of the remote controller is clicked, the control circuit of the remote controller start searching for the frequency of the electric apparatus automatically.

(2) Quick Searching:

The receiving frequencies of different electric apparatus from different manufacturers are arranged in a table in proper order so that a searching can be done within 1 second to 3 minutes and 40 seconds.

(3) Auto-Locking:

When the correct frequency has been searched, it is automatically locked when any key of the remote controller is clicked. Sensing means may be installed in the power circuit of the electric apparatus to be controlled, to transmit an electromagnetic wave to the remote controller when the correct frequency of the electric apparatus has been searched, causing the remote controller to automatically lock the searched frequency.

(4) Multi-function:

A specific function switch is provided and adapted to switch the keys of the remote controller between different functions.

The programmed frequency data of the control circuit covers currently commercially available electric apparatus from more than 50 word famous manufacturers within latest 16 years within the frequency range of 32 KHZ to 44 KHZ. Therefore, the remote controller can be set for controlling most currently commercially available electric apparatus.

BRIEF DESCRIPTION OF THE DRAWINGS

FIG. 4 is a reference function table of the key array according to the present invention.

DETAILED DESCRIPTION OF THE PREFERRED EMBODIMENT

Figure 1:
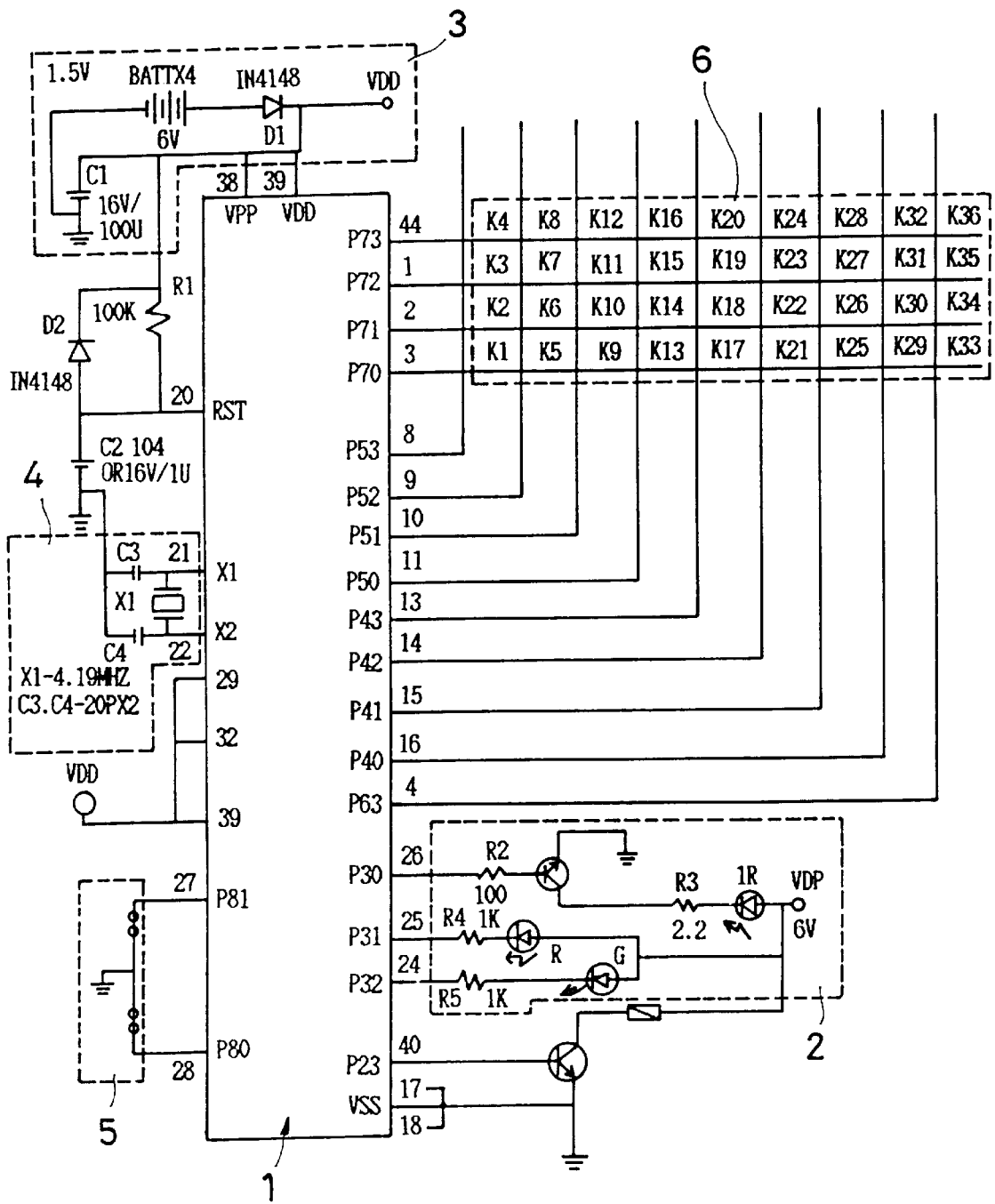
FIG. 1 is a circuit diagram of a control circuit according to the present invention.
Figure 2:
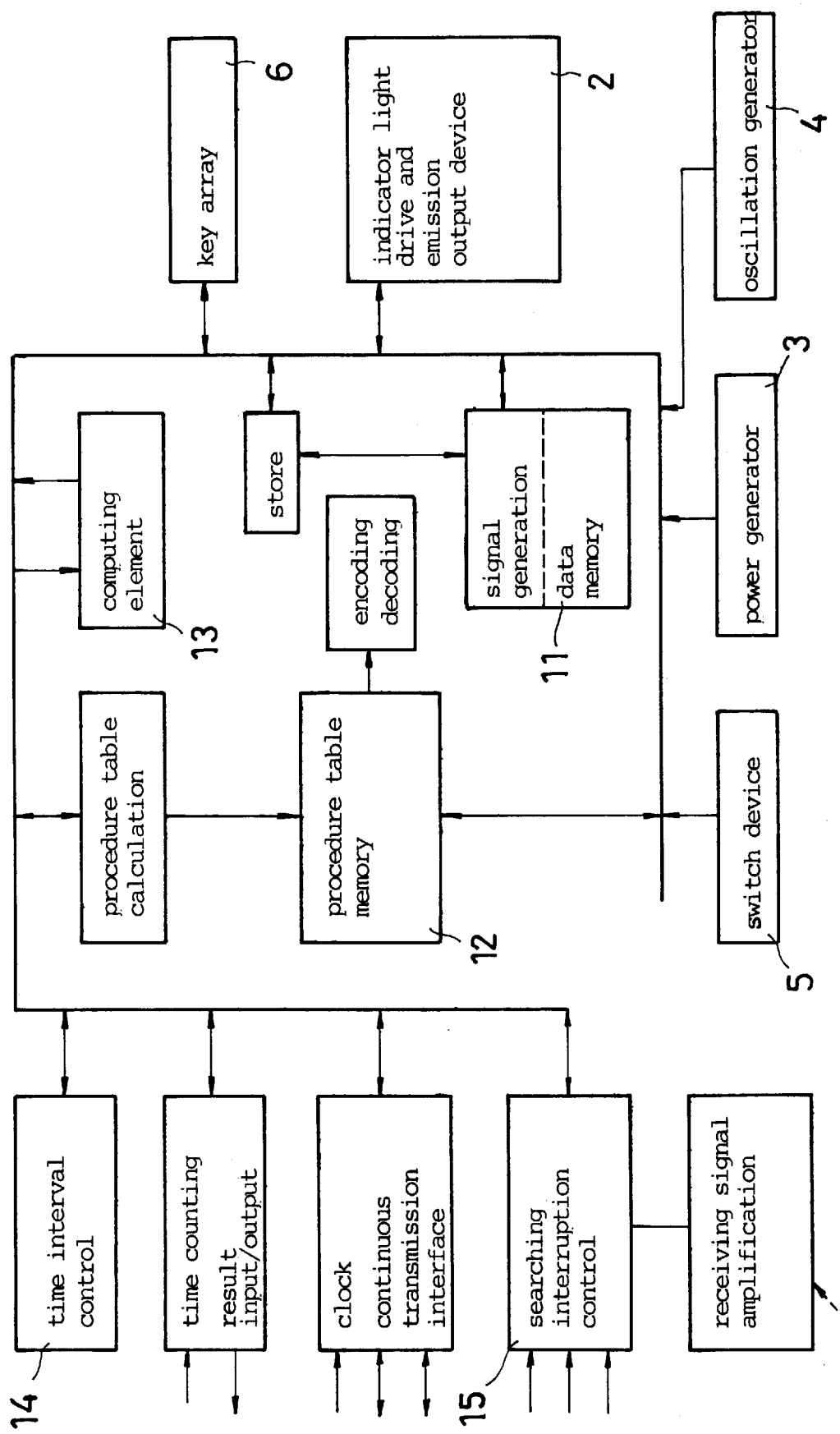
FIG. 2 is a system block diagram of the control circuit according to the present invention.

Referring to FIGS. 1 and 2, a control circuit of a remote controller in accordance with the present invention comprises a CPU (central processing unit) 1. The CPU 1 comprises a data memory 11 adapted to record search codes of different electric apparatus, a procedure table memory 12 adapted to record key functions of different electric apparatus and to provide function data corresponding to recorded key functions for locking, a computing element 13 adapted to keep multiplying the search until an interruption and locking operation is executed, a time control 14 adapted to control a delay time of 1.5 seconds for locking, and a search interruption control 15 adapted to interrupt a search and to lock the search when a searched frequency is in conformity.

The control circuit of the remote controller further comprises an indicator light drive and emission output device 2 adapted to control an indicator light on the control panel responsive to voltage values from the CPU 1, an oscillation generator 4 adapted to provide the CPU 1 with the function of time counting, and a switch device 5 for switching between functions.

Figure 3:
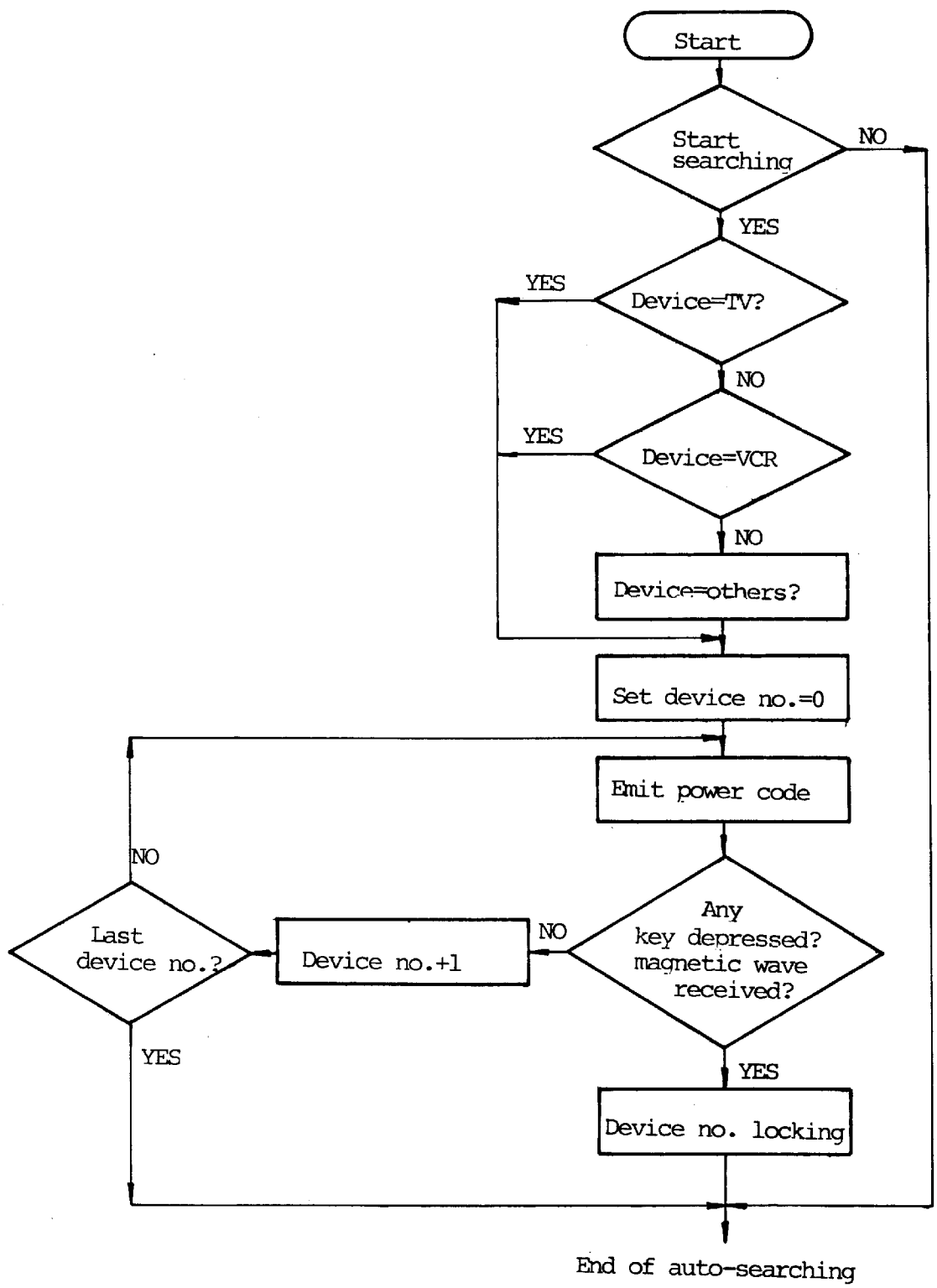
FIG. 3 is a operation flow chart according to the present invention.

Referring to FIG. 3, when in use, the remote controller is aimed at the electric apparatus to be controlled (for example, TV, video cassette recorder, CD-ROM player, audio equipment, air conditioner, etc.), then the set key is clicked, enabling the CPU 1 to receive power and time counting pulse from the power generator 3 and the oscillation generator 4 and then to start searching. When searching, a bit of pre-stored frequency data is fetched from the data memory 11 and converted into a transmitting signal, and the transmitting signal is then transmitted to the electric apparatus by the indicator light drive and emission output device 2. When the power switch of the electric apparatus is turned on or off, it means the correct frequency has been obtained, thus the searching is stopped. On the contrary, the calculation function of the computing element 13 keeps fetching a next bit of data from the data memory 11 and then converts it into a corresponding transmitting signal, permitting it to be transmitted to the electric apparatus by the indicator light drive and emission output device 2. The whole cycle of searching is completed within 3 minutes and 40 seconds. When the correct frequency is searched, the time control 14 controls a delay time of 1.5 seconds for locking, and the searched frequency is locked when any key is depressed within such a delay time of 1.5 seconds. Sensing means may be installed in the power circuit of the electric apparatus to be controlled, so that the reflector means transmits an electromagnetic wave to the controller when the correct frequency is searched, thereby causing the remote controller to automatically lock the searched correct frequency. After locking, the search interruption control 15 records the code of the electric apparatus searched, and the procedure table memory 12 fetches the function array for the key array 6 corresponding to the electric apparatus searched, and thus the function setting is done (see FIG. 4).

Further, a special function key of the switch device 5 is coupled to the procedure table memory 12 for changing the functions associated with the key array 6. When the special function key of the switch 5 is clicked, the LED indicator light is switched on, and the key array 6 of the remote controller is designated for different functions, such as the functions of a calculator.

The remote controller is functional for time setting control. The user can set an electric apparatus for example an electric cooker or air conditioner to start operating at a predetermined time.

It is to be understood that the drawings are designed for purposes of illustration only, and are not intended as a definition of the limits and scope of the invention disclosed.

What the invention claimed is:

1. A control circuit for a remote control device, comprising:

a key switch array for designating predetermined functions of an electrical apparatus selected to be controlled;

a processor having a plurality of first inputs coupled to said key switch array, said processor including (a) a data memory having signal codes of a plurality of different electrical apparatuses pre-stored therein, (b) a procedure table memory for storing a plurality of functions associated with said key switch array, (c) a computing element for sequential output of signal codes from said data memory responsive to a first momentary operation of selected keys of said key switch array, (d) a search interruption control coupled to said computing element for terminating said sequential output responsive to a second momentary operation of any key of said key switch array and storing a signal code being output coincidence with said second momentary operation of any key, and (e) timing means for controlling a rate of said sequential output of signal codes; and, an emission output device having an input coupled to said processor for transmitting said signal codes to the electrical apparatus.

2. A control circuit for a remote control device, comprising:

a key switch array for designating predetermined functions of an electrical apparatus selected to be controlled;

a processor having a plurality of first inputs coupled to said key switch array, said processor including (a) a data memory having signal codes of a plurality of different electrical apparatuses pre-stored therein, (b) a procedure table memory for storing a plurality of functions associated with said key switch array, (c) a computing element for sequential output of signal codes from said data memory responsive to a first momentary operation of selected keys of said key switch array, (d) a search interruption control coupled to said computing element for terminating said sequential output responsive to a second momentary operation of any key of said key switch array and storing a signal code being output coincidence with said second momentary operation of any key, and (e) timing means for controlling a rate of said sequential output of signal codes;

an emission output device having an input coupled to said processor for transmitting said signal codes to the electrical apparatus; and, means for receiving a signal transmitted from an external source, said receiving means having an output coupled to said search interruption control for terminating said sequential output responsive to receipt of said transmitted signal.

3. A control circuit for a remote control device, comprising:

a key switch array for designating predetermined functions of an electrical apparatus selected to be controlled;

a processor having a plurality of first inputs coupled to said key switch array, said processor including (a) a data memory having signal codes of a plurality of different electrical apparatuses pre-stored therein, (b) a procedure table memory for storing a plurality of functions associated with said key switch array, (c) a computing element for sequential output of signal codes from said data memory responsive to a first momentary operation of selected keys of said key switch array, (d) a search interruption control coupled to said computing element for terminating said sequential output responsive to a second momentary operation of any key of said key switch array and storing a signal code being output coincidence with said second momentary operation of any key, and (e) timing means for controlling a rate of said sequential output of signal codes;

an emission output device having an input coupled to said processor for transmitting said signal codes to the electrical apparatus; and, a switch device coupled to said procedure table memory for selecting a portion of said plurality of functions associated with said key switch array representing functions of a calculator.

* * * * *